(12) United States Patent
Riedl

(10) Patent No.: US 10,572,782 B2
(45) Date of Patent: Feb. 25, 2020

(54) PORTABLE DATA CARRIER COMPRISING A RELIEF STRUCTURE

(71) Applicant: GIESECKE+DEVRIENT MOBILE SECURITY GMBH, Munich (DE)

(72) Inventor: Josef Riedl, Attenkirchen (DE)

(73) Assignee: GIESECKE+DEVRIENT MOBILE SECURITY GMBH, Munich (DE)

( * ) Notice: Subject to any disclaimer, the term of this patent is extended or adjusted under 35 U.S.C. 154(b) by 0 days.

(21) Appl. No.: 16/076,847

(22) PCT Filed: Feb. 14, 2017

(86) PCT No.: PCT/EP2017/000204
§ 371 (c)(1),
(2) Date: Aug. 9, 2018

(87) PCT Pub. No.: WO2017/140421
PCT Pub. Date: Aug. 24, 2017

(65) Prior Publication Data
US 2019/0065917 A1    Feb. 28, 2019

(30) Foreign Application Priority Data
Feb. 17, 2016    (DE) .................... 10 2016 001 834

(51) Int. Cl.
*G06K 19/00*    (2006.01)
*G06K 19/02*    (2006.01)
*B42D 25/425*    (2014.01)
*B42D 25/36*    (2014.01)
*B42D 25/23*    (2014.01)
*B42D 25/324*    (2014.01)

(52) U.S. Cl.
CPC ............. *G06K 19/02* (2013.01); *B42D 25/23* (2014.10); *B42D 25/324* (2014.10); *B42D 25/36* (2014.10); *B42D 25/425* (2014.10)

(58) Field of Classification Search
USPC ................................................ 235/494, 487
See application file for complete search history.

(56) References Cited

U.S. PATENT DOCUMENTS

| | | |
|---|---|---|
| 3,391,479 A | 7/1968 | Buzzell et al. |
| 3,581,416 A | 6/1971 | Andrews et al. |
| 4,507,346 A | 3/1985 | Maurer et al. |
| 4,522,670 A | 6/1985 | Caines |

(Continued)

FOREIGN PATENT DOCUMENTS

| | | |
|---|---|---|
| DE | 3213315 A1 | 10/1983 |
| DE | 3314244 A1 | 10/1984 |

(Continued)

OTHER PUBLICATIONS

German Search Report from DE Application No. 102016001834.8, dated Dec. 12, 2016.

(Continued)

*Primary Examiner* — Daniel A Hess
(74) *Attorney, Agent, or Firm* — Workman Nydegger

(57) ABSTRACT

A portable data carrier is composed of several foils, wherein the data carrier has a three-dimensional high embossing on at least one of its outsides. At least one foil containing at least one additive is arranged in the region of the high embossing. The additive has a dichroic property such that the additive reflects a different color in dependence on the viewing angle.

5 Claims, 1 Drawing Sheet

(56) References Cited

U.S. PATENT DOCUMENTS

| | | | |
|---|---|---|---|
| 5,005,872 | A | 4/1991 | Lass et al. |
| 5,122,813 | A | 6/1992 | Lass et al. |
| 5,631,039 | A | 5/1997 | Knight et al. |
| 5,876,068 | A | 3/1999 | Schneider et al. |
| 2007/0224341 | A1 | 9/2007 | Kuntz et al. |

FOREIGN PATENT DOCUMENTS

| | | | |
|---|---|---|---|
| DE | 3906695 | A1 | 9/1989 |
| DE | 69505539 | T2 | 6/1999 |
| DE | 102013109002 | A1 | 9/2014 |
| EP | 0308904 | A2 | 3/1989 |
| GB | 1167519 | A | 10/1969 |

OTHER PUBLICATIONS

International Search Report from PCT Application No. PCT/EP2017/000204, dated May 11, 2017.

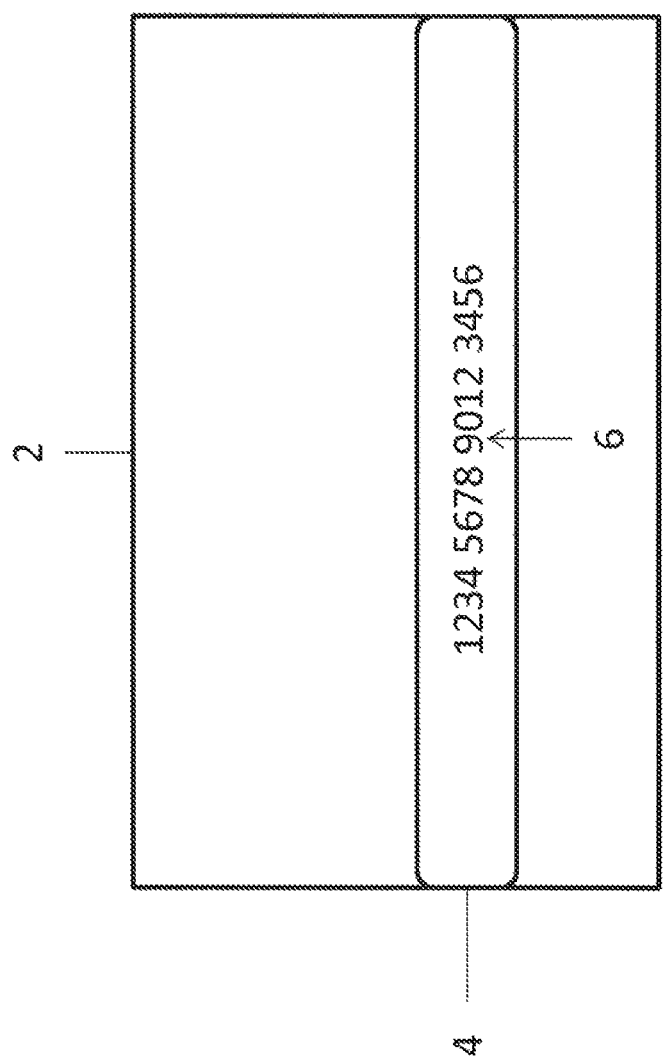

PORTABLE DATA CARRIER COMPRISING A RELIEF STRUCTURE

BACKGROUND

The present invention describes a portable data carrier which is composed of several foils and has a high embossing on its outside.

Portable data carriers, such as e.g. credit cards, bank cards, have a high embossing on their outside. The high embossing is made visible by means of an ink, wherein the ink is applied thermally to the high embossing for example. The ink, which forms a contrast to the surrounding surface the data carrier, is rubbed off within a short time due to normal use, so that the contrast and a recognizability of the high embossing become increasingly weaker in the course of the use of the data carrier. The consequence is that the high embossing cannot be read any longer or is very difficult to read.

SUMMARY

It is therefore the object of the present invention to make available a solution to the above-described problem that the high embossing of a portable data carrier remains readily readable during the use of the data carrier.

The object is achieved by a portable data carrier which is composed of several foils, wherein the data carrier has a three-dimensional high embossing on at least one of its outer sides. In the region of the high embossing at least one foil is arranged, which contains at least one additive. The additive has a dichroic property, so that the additive reflects a different color in dependence on the viewing angle. The advantage of the invention is that the additive which forms a contrast to the surrounding surface of the portable data carrier is integrated in the foil, so that the contrast does not disappear through normal and intended use of the data carrier, as occurring in the state of the art, by the ink arranged on the surface of the high embossing being rubbed off.

An advantageous embodiment is that the foil containing an additive is arranged on the outside and/or on the inside of the data carrier. The advantage is that the dichroic property of the additive is best recognizable on the outside. While it is possible to arrange the additive also in foils on the inside of the data carrier, the foils disposed above then have to consist of a light-transmissive material, so that the dichroic property of the additive becomes apparent and/or can be recognized from the outside.

A further advantageous embodiment is that the foil in which the additive is arranged is a strip foil. The advantage of a strip of foil is that the costs, for example for the additive, are kept low, when a strip foil containing at least one additive is arranged for example only in the region of the high embossing.

A further advantageous embodiment is that the additive is a pigment and/or a filler and/or a dye and/or a liquid crystal pigment. In addition to the examples mentioned, all other suitable additives are possible. For example, Colorstream pigments, Iriodine or Miraval are commercially available as additives. As liquid crystal pigments Helicone are commercially available, for example.

A further advantageous embodiment is that the foil in which the additive is arranged is a dichromic foil. This enhances the contrast of the high embossing to the environment.

BRIEF DESCRIPTION OF THE DRAWINGS

Further features and advantages of the invention will become apparent from the following description of an embodiment according to the invention in connection with FIG. 1.

DETAILED DESCRIPTION OF VARIOUS EMBODIMENTS

The portable data carrier 2 according to the invention is shown in plan view in FIG. 1. The data carrier 2 has on its outside a foil 4 with at least one additive which has a dichroic property. In the foil 4 a high embossing 6 is disposed, for example in the form of any desired series of numbers. The high embossing 6 being arranged in the foil 4 with additive results in a permanent contrast between the high embossing 6 in the form of the exemplary series of numbers and the surrounding surface of the data carrier 2, so that the high embossing 6 is readily recognized permanently, without the disadvantage of the prior art that the contrast becomes increasingly weaker, since the applied ink on the surface of the high embossing is rubbed off by the usual use.

In FIG. 1 the foil 4 extends substantially over the region of the high embossing 6. It is equally possible, however, that the foil 4 extends also over the entire surface of the data carrier 2. For the case shown in FIG. 1 strip foils are particularly expedient. Strip foils with a dichroic additive can be cut to size very precisely for a specific area, e.g. of a high embossing, of a portable data carrier, for example when it is intended to save production costs.

LIST OF REFERENCE NUMERALS 2 portable data carrier
4 foil with additives
6 high embossing

The invention claimed is:

1. A portable data carrier which is composed of several foils,
   wherein the data carrier has a three-dimensional high embossing on at least one of its outsides,
   wherein in the region of the high embossing at least one foil is arranged, which contains at least one additive,
   wherein the additive has a dichroic property, so that the additive reflects a different color in dependence on the viewing angle,
   wherein the foil containing the at least one additive is arranged on the outside of the data carrier, and
   wherein the foil, in which the additive is arranged, is a strip foil.

2. The portable data carrier according to claim 1, wherein the additive is a pigment and/or a filler and/or a dye and/or a liquid crystal pigment.

3. The portable data carrier according to claim 2, wherein the additive is a liquid crystal pigment.

4. The portable data carrier according to claim 1, wherein the foil, in which the additive is arranged, is a dichromic foil.

5. A portable data carrier which is composed of several foils,
   wherein the data carrier has a three-dimensional high embossing on at least one of its outsides,
   wherein in the region of the high embossing at least one foil is arranged, which contains at least one additive,
   wherein the additive has a dichroic property, so that the additive reflects a different color in dependence on the viewing angle, and wherein the foil containing the at least one additive is arranged on the inside of the data carrier, at least one outer foil disposed above the at least one foil containing the additive, said at least one outer foil comprising a light transmissive material.

* * * * *